(12) United States Patent
Rammhofer et al.

(10) Patent No.: US 8,051,658 B2
(45) Date of Patent: Nov. 8, 2011

(54) HYDRAULIC ELEMENT

(75) Inventors: Thomas Rammhofer, Sasbach (DE);
Jan Grabenstaetter, Gernsbach (DE)

(73) Assignee: Luk Vermoegensverwaltungsgesellschaft mbH, Buehl (DE)

( * ) Notice: Subject to any disclaimer, the term of this patent is extended or adjusted under 35 U.S.C. 154(b) by 0 days.

(21) Appl. No.: 12/727,946

(22) Filed: Mar. 19, 2010

(65) Prior Publication Data

US 2010/0242468 A1    Sep. 30, 2010

Related U.S. Application Data

(63) Continuation of application No. PCT/DE2008/001438, filed on Aug. 28, 2008.

(30) Foreign Application Priority Data

Sep. 20, 2007   (DE) .......................... 10 2007 045 034

(51) Int. Cl.
*F16D 31/02* (2006.01)
(52) U.S. Cl. ......................................................... 60/591
(58) Field of Classification Search ..................... 60/591; 137/493.6, 493, 512.5
See application file for complete search history.

(56) References Cited

U.S. PATENT DOCUMENTS

| | | | |
|---|---|---|---|
| 2,490,511 A | 12/1949 | Louis Courtot | |
| 2,835,271 A * | 5/1958 | Heinrich | 60/591 |
| 6,470,909 B2 * | 10/2002 | Osterlanger et al. | 137/493.8 |
| 7,219,496 B2 * | 5/2007 | Grabenstaetter | 60/591 |
| 2001/0020415 A1 | 9/2001 | Osterlanger et al. | |

FOREIGN PATENT DOCUMENTS

| | | |
|---|---|---|
| DE | 4417961 | 11/1995 |
| DE | 10059382 | 6/2001 |
| GB | 2022778 | 12/1979 |
| GB | 2099085 | 12/1982 |

* cited by examiner

*Primary Examiner* — Michael Leslie
(74) *Attorney, Agent, or Firm* — Davidson, Davidson & Kappel, LLC

(57) ABSTRACT

A hydraulic element, in particular for arranging in a pressure line between a master cylinder and a slave cylinder of a hydraulic clutch actuating arrangement, having a housing which has a master-cylinder-side hydraulic connection and a slave-cylinder-side hydraulic connection and which holds a valve arrangement, a simpler design is obtained in that the valve arrangement has two valve bodies which are mounted in a floating fashion in the housing and which can be moved relative to one another counter to the force of a spring.

9 Claims, 2 Drawing Sheets

HYDRAULIC ELEMENT

This is a continuation of prior International Application PCT/DE2008/001438, filed Aug. 28, 2008, which claims priority to German Patent Application DE 10 2007 045 034.8, filed Sep. 20, 2007, the entire disclosures of which are hereby incorporated by reference herein.

The present invention relates to a hydraulic element, in particular, for the arrangement in a pressure line between a master cylinder and a slave cylinder of a hydraulic clutch operation system, with housing that features a master-cylinder-side hydraulic connection and a slave-cylinder-side hydraulic connection and accommodates a valve arrangement.

BACKGROUND

From DE 100 59 382, FIG. 6, in particular, a generic hydraulic element, a so-called anti-vibration unit is disclosed, which comprises two independent spring-loaded check valves. The opening pressure in both flow directions can be determined individually by spring preload for each direction. Such a part consists of many components and is complicated in assemblage.

Hydraulic elements in which valve function is formed by means of pinch valves for a flow direction.

Generic hydraulic elements known from the state of the art comprise a variety of individual parts by which the assemblage is complex.

SUMMARY OF THE INVENTION

An object of the present invention is to provide a simple design for such a hydraulic element, in particular, to be able to manufacture this under the application of a few individual parts for instance or individual parts with little accuracy requirements.

The present invention provides a hydraulic element, in particular, for the arrangement in a pressure line between a master cylinder and a slave cylinder of a hydraulic clutch operation system, with housing that features one master-cylinder-side hydraulic connection as well as a slave-cylinder-side hydraulic connection and that accommodates its valve arrangement wherein the valve arrangement features two valve bodies that are supported inside the housing in a floating manner, and that can be displaced relative to one another against a spring force.

The valve arrangement comprises preferably an external valve body and an internal valve body, whereby the external valve body comprises a cup-shaped valve cup in which a tube-shaped section of the internal valve body is supported in a displaceable manner, wherein the valve cup and the tube-shaped section features at least a connection hole that can be brought to overlap depending on the position of the valve body relative to one another.

The outside valve body comprises preferably a valve head that features an axial hole and a radial hole connected with the latter. The valve head serves, in particular, the radial guide of the valve body in a hollow cylindrical section of the housing.

The external valve body and the internal valve body comprise preferably a means that prevents rotation in opposite directions of both bodies. This means prevents both bodies from rotating in opposite directions such that the holes cannot be brought to overlap. The means comprises preferably a finger of the internal valve body that is guided in an axial groove of the external valve body. Alternatively, this function could be assumed, e.g., also by the spring disposed between the two valve heads.

The internal valve body comprises preferably a valve head that forms a valve seat with the housing in an axial end position of the valve body. The valve seat seals the master-cylinder-side relative to the section located between the two valve heads, so that fluid can flow only via the axial hole in the internal valve body. With this, the damping filter has different flow resistances in the two flow directions.

The valve head of the internal valve body allows a gap preferably relative to a hollow-cylindrical section of the housing. The valve head fluid pushed out of the valve seat can flow through the gap.

The housing comprises preferably a clutch assembly on one side. The clutch assembly is mounted after the filter arrangement has been mounted.

The present invention also provides a hydraulic clutch operation system with a master cylinder, a slave cylinder and a pressure line connecting this pressure line, whereby a hydraulic element according to the invention is disposed in the pressure line.

BRIEF DESCRIPTION OF THE DRAWINGS

In the following figures are exemplary embodiments of the invention illustrated, based on the attached drawings, as follows.

DETAILED DESCRIPTION

Figure 1:
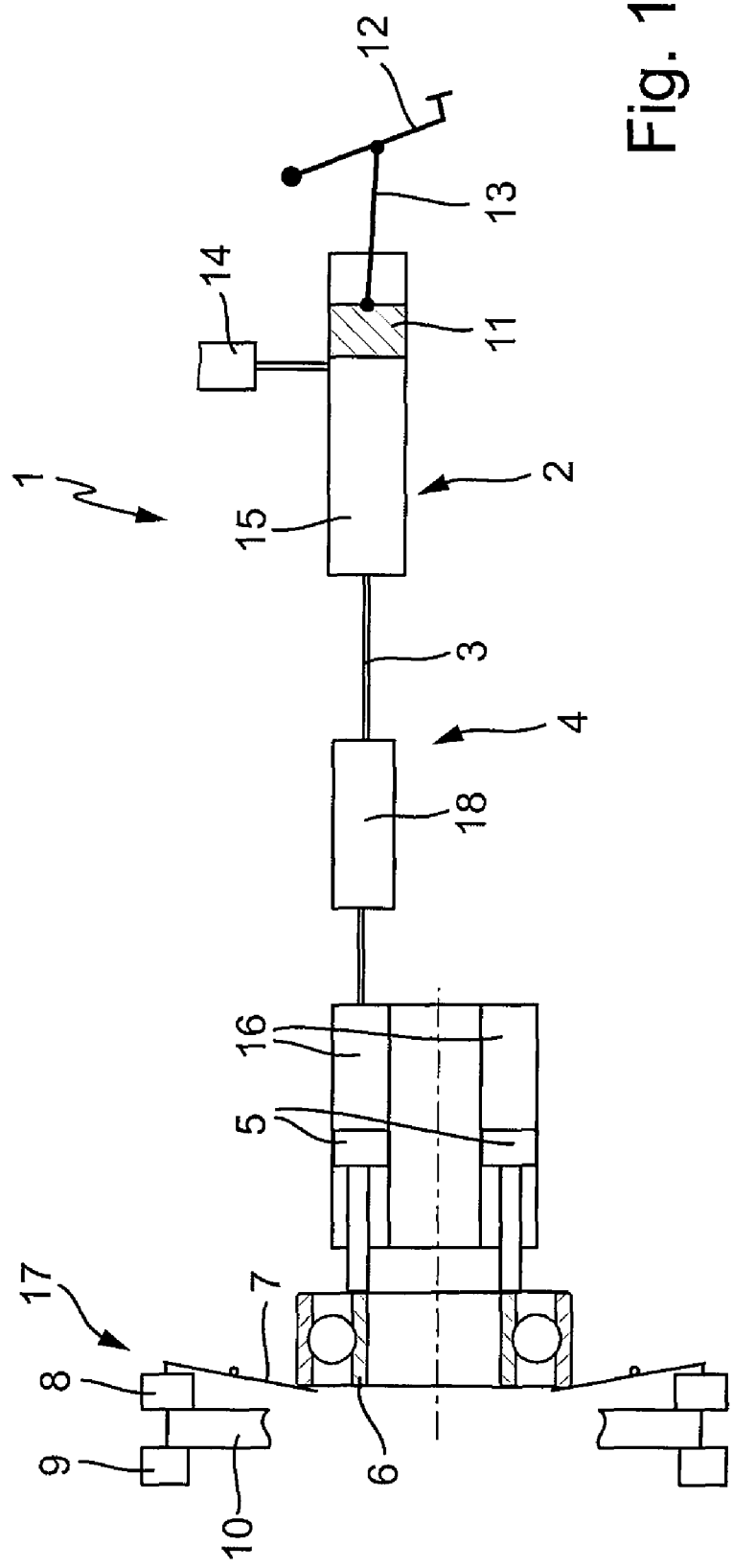
FIG. 1 shows a schematic illustration of a hydraulic system for operating a vehicle clutch.

FIG. 1 shows as an example of a hydraulic power transmission system of a hydraulic clutch operation system 1 for a vehicle. The hydraulic clutch operation system 1 comprises a master cylinder 2 in a common manner that is connected hydraulically via a hydraulic pressure line 3 with a slave cylinder 4. The slave cylinder 4, for instance, can be formed as annular slave cylinder, a concentric slave cylinder, whereby an annular slave cylinder piston 5 is supported in annular cylinder housing. The annular slave cylinder 4 and the annular slave cylinder piston 5 again enclose an annular pressure chamber 16. Upon actuation of the slave cylinder piston 5, via a release bearing 6, a disk spring 7 is activated in a common manner. The disk spring 7 serves to activate a vehicle clutch 17. The latter comprises a pressure plate 8, a counter pressure plate 9 and a clutch disk 10. The disk spring 7 is preloaded such that it presses the pressure plate 8 onto a counter pressure plate 9 in the preload direction, and in the process, it clamps a clutch disk 10 that is connected non-rotatably with a transmission input shaft, between pressure plate 8 and counter pressure plate 9. The pressure plate 8 and the counter pressure plate 9 are connected non-rotatably with a crankshaft of an internal combustion engine. When the slave cylinder 4 is pressurized, the disk spring 7 is moved via the slave cylinder piston 5 and the release bearing 6 that decrease the pressure in its preload direction, the pressure exerted by the pressure plate 8 towards the pressure plate 9, and thus creating the frictional connection between the clutch disk 10 and pressure plate 8 or counter pressure plate 9, is released. The master cylinder 2 comprises a master cylinder piston 11 that is activated by means of a clutch pedal 12 via a pressure rod 13.

Housing of the master cylinder 2 and the master cylinder piston 11 disposed movably inside enclose a pressure chamber 15. A pressure-less tank 14 is hydraulically connected with the pressure chamber 15 in a pressure-less system, thus, the master cylinder piston 11 is extended to the furthest position outside the master cylinder 2.

For a hydraulic clutch operation system 1, as depicted in FIG. 1, vibrations are transmitted to the slave cylinder 4 from the combustion engine in particular from its crankshaft, via vehicle clutch 17 components. These vibrations are generated inside the pressure chamber of the slave cylinder 4 and thus inside the entire hydraulic system, comprising the pressure line 3 and the master cylinder 2—pressure vibrations noticeable on the clutch pedal, as vibrations. To dampen these pressure vibrations (pressure pulsation) a hydraulic element 18, hereinafter designated as a damping filter 18, is disposed in the pressure line 3.

The hydraulic clutch operation system according to FIG. 1 is familiar of course. Instead of using a concentric release bearing as the slave cylinder 4, also other hydraulic release bearings can be used, for instance, a lever release bearing that interacts with a slave cylinder. Likewise, instead of an operation of the master cylinder 2 with a clutch pedal 12, an electrical actuator or the likes can be provided. Instead of exerting force on the disk spring to open as done here, the clutch can also be closed by exerting pressure (actively closed clutch). The embodiment of the master cylinder as well as that of the slave cylinder and likewise that of the clutch can be arbitrary; the prior depicted exemplary embodiment is only one of many possibilities.

Figure 2:
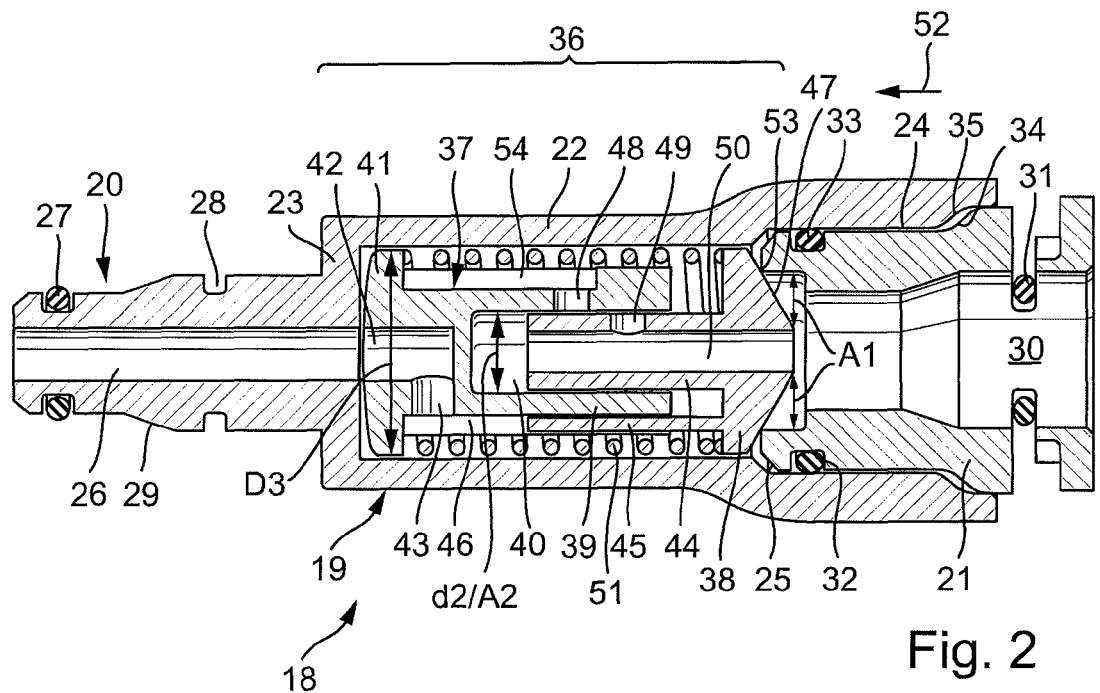
FIG. 2 shows an exemplary embodiment of a damping filter according to the invention in a longitudinal section.
Figure 3:
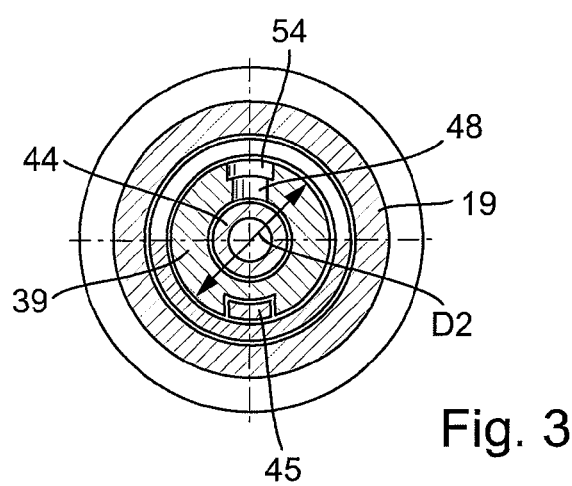
FIG. 3 shows the damping filter according to FIG. 2 in Section A-A.

FIG. 2 shows a damping filter 18 according to the invention, in a longitudinal section, FIG. 3 shows the damping filter of FIG. 2 in Section A-A. The damping filter 18 essentially comprises rotationally symmetrical housing 19 that on the one side comprises hydraulic plug 20 for connecting the damping filter 18 with a hydraulic socket of the pressure line 3 according to FIG. 1. The plug 20 forms a slave-cylinder-side hydraulic connection. On the side opposite the plug 20 of the housing 19, a socket assembly 21 is fitted as a clutch assembly with socket 30 for plug connection in the housing 19. The socket 30 forms a master-cylinder-side hydraulic connection. Obviously, plug 20 and socket 30 can be swapped or both connections can be formed as plug or as socket. The plug 20 and socket 30 of the socket assembly 21 can belong to the same hydraulic plug-socket connection; in this case, one could connect the plug 20 of a damping filter 18 with the socket 30 of another damping filter 18, but they also belong to different types of hydraulic plug-socket connections.

The housing 19 comprises a hollow-cylindrical section 22 that on one side transforms into a cup-shaped bottom section 23 of the plug 20, and on the other side, it transforms via a conical section 25 in a second hollow-cylindrical section 24 for accommodating the socket assembly 21. The plug 20 features a through hole 26 that extends up to the hollow-cylindrical section 22.

The plug 20 comprises a seal ring 27 as well as a ring groove 28. Between the seal 27 and the ring groove 28 is a conical section 29 disposed, so that also the diameter of the plug 20 increases in this section. The socket group 21 features the receiving socket 30 that is formed such that it can accommodate a plug similar to that formed by plug 20. Thus, a formed wire spring 31 engages with a corresponding ring groove 28 of the plug to be accommodated, which is introduced into the accommodating opening 30. The socket group 21 carries in a ring groove 32 a seal ring 33 that seals the gap between the housing 19 and the socket group 21. The socket group 21, for instance, can be screwed together with the housing 19, likewise, also a bayonet lock or a similar means can be provided or both parts can be glued or welded with one another or, for example, it can be friction-welded. A conical section 34 of the socket group 21 and a corresponding conical section 35 that adjoins to the second hollow-cylindrical section 24, serve for axial positioning of the socket group 21 relative to the housing 19.

Between the socket group 21 and the bottom 23 a valve arrangement 36 supported. The valve arrangement 36 comprises an external valve body 37 and an internal valve body 38 that are supported in the housing 19 in a floating manner. The external valve body 37 comprises essentially of a cup-shaped valve cup 39 that features a blind hole 40 with an internal diameter d2. The valve cup 39 transforms to its cup bottom side into a valve head 41. The valve cup 39 has an external diameter D2 that is obviously greater than the internal diameter d2. The valve head 41 has an external diameter D3 that forms a clearance fit with the internal diameter of the hollow-cylindrical section 22. The valve head 41 features an axial hole 42 that connects the through-hole 26, via a radial hole 43, with the hollow-cylindrical section 22. The internal valve body 38 comprises a tube-shaped section 44 with an external diameter that with the internal diameter d2 of the valve cup 39 a clearance fit. The tube-shaped section 44 is enclosed by the valve cup 39 and is supported in a sliding manner in this axial direction. The internal valve body 38 comprises furthermore a finger 45 that essentially extends in essentially parallel to the tube-shaped section 44 and meshes with an axial groove 46 that is provided in axial direction inside the valve cup 39. The finger 45 together with the axial groove 46 provides non-rotational locking of the internal valve body 38 relative to the external valve body 37. The internal valve body 38 comprises an axial hole 50 that extends in axial direction as well as a valve head 47 that is essentially conical in shape. The valve cup 39 of the external valve body 37 features a connection-hole 48, the tube-shaped section 44 of the internal valve body 38 features a connection-hole 49. The connection hole 48 transforms into a longitudinal groove 54. When the connection holes 48 and 49 coincide at least partially, then the axial hole 42 is hydraulically connected with the axial hole 50, so that fluid can flow through the damping filter 18. Between the valve head 41 of the external valve body 37 and the valve head 47 of the internal valve body 38 is a spring 51 disposed that presses the two valve bodies 41, 47 and hence the internal valve body 38 and the external valve body 37 apart.

If fluid is pushed from the master cylinder side towards the slave cylinder, then on the circular surface of the valve head 47 designated with the double arrows A1 of the internal valve body 38 a pressure that depends on the level of the pressure difference and on the size of the surface A1 exerts a force in the direction of the arrow 52 on the internal valve body 38. In this way, the internal valve body 38 is pressed against the force of the spring 51 in the direction of the arrow 52. Depending on the level of the force resulting from the pressure difference, this movement occurs against the force of the spring 51 so far until the connection holes 48 and 49 coincide. Now fluid can flow from axial-hole 50 via the connection holes 48 and 49, the remaining section of the hollow-cylindrical area 22, the radial hole 43 and the axial hole 42 in the through-hole 26. Between the external circumference of the valve head 47 of the internal valve body 38 and of the wall of the hollow-cylindrical section 22 a gap remains, through which fluid can flow as well. In the pressure-less state, as depicted in FIG. 2, the valve head 47 with the socket group 21 forms a valve seat 53 that practically does not allow fluid to flow-through.

When engaging the clutch while the pressure on the slave-cylinder-side is higher than that on the master cylinder side, a resultant surface area A2 is effective; this is the surface area determined by the internal diameter d2 of the valve cup 39 and a pressure force depending on the area A2 and on the pressure difference between master-cylinder-side and slave-cylinder-side in the direction opposite to the arrow 52. The hydraulically effective surface area when the pressure on the slave-cylinder-side is higher than on the master-cylinder-side corresponds to the cross-section area of the blind hole 40, since all other pressures forces on the external valve body cancel out, ultimately the pressure of the slave cylinder side acts via the hole 43 also in the section in which the spring 51 is disposed. If this pressure force exceeds the force of the spring 51, then the external valve body 37 will be moved against the arrow 52 direction, so that the connection holes 48 and 49 coincide or at least partially coincide and release the flow—depending on the pressure difference of master-cylinder-side and slave-cylinder-side, and on the spring-51 force. The connection holes 48 and 49 can also be brought to coincide in both flow directions depending on the positions of the valve bodies relative to one another.

The internal leakage between the master-cylinder-side and slave-cylinder-side is determined by the gap featured by the guide of the internal valve body 38 in the external valve body 37. During vacuum pressure charge, the slave cylinder is evacuated via this gap.

REFERENCE SYMBOLS LIST 1 hydraulic clutch actuation
2 master cylinder
3 pressure line
4 slave cylinder
5 slave cylinder piston
6 release bearing
7 disc spring
8 pressure plate
9 counter-pressure plate
10 clutch disk
11 master cylinder piston
12 clutch pedals
13 push rod
14 pressure-less tank
15 pressure chamber
16 pressure chamber
17 vehicle clutch
18 damping filter
19 housing
20 plug
21 socket assembly
22 hollow cylindrical section
23 bottom section
24 second cylindrical section
25 conical section
26 through hole
27 seal ring
28 ring groove
29 conical section
30 mounting socket
31 formed wire spring
32 ring groove
33 seal
34 conical section
35 conical section
36 valve arrangement
37 external valve body
38 internal valve body
39 valve cup
40 blind hole
41 valve head
42 axial hole
43 radial hole
44 tube-shaped section
45 finger
46 axial groove
47 valve head
48 connection hole
49 connection hole
50 axial hole
51 spring
52 arrow
53 valve seat
54 longitudinal groove

What is claimed is:

1. A hydraulic element comprising: a housing having a master-cylinder-side hydraulic connection and a slave-cylinder-side hydraulic connection; accommodated in the housing, a valve arrangement, the valve arrangement having a first valve body and a second valve body, the first and second valve bodies being supported in a floating manner inside the housing and displaceable relative to one another against a force of a spring, wherein the first valve body is an external valve and the second valve body is an internal valve, the external valve body comprising a cup-shaped valve cup supporting in a sliding manner a tube-shaped section of the internal valve body, whereby the valve cup and the tube-shaped section respectively have connection holes that can coincide with one another depending on a relative position of the external and internal valve bodies.

2. The hydraulic element as recited in claim 1 wherein the external valve body comprises a valve head having an axial hole and a radial hole connected with the axial hole.

3. The hydraulic element as recited in claim 1 wherein the external valve body and the internal valve body each comprise a component that prevents rotation of the external valve body and the internal valve body relative to one another.

4. The hydraulic element as recited in claim 3 wherein the component of the internal valve body is a finger and the component of the external valve body is an axial groove, the finger being guided in the axial groove.

5. The hydraulic element as recited in claim 1 wherein the internal valve body comprises a valve head which forms a valve seat with the housing in an axial end position of the valve body.

6. The hydraulic element as recited in claim 5 wherein the valve head of the internal valve body leaves a gap relative to a hollow-cylindrical section of the housing.

7. The hydraulic element as recited in claim 1 wherein the housing comprises a clutch assembly on one side.

8. A hydraulic clutch operation system with a master cylinder, a slave cylinder and a pressure line connecting the master cylinder and the slave cylinder, wherein the hydraulic element as recited in claim 1 is disposed in the pressure line.

9. The hydraulic element as recited in claim 1 wherein the hydraulic element is for the arrangement in a pressure line between a master cylinder and a slave cylinder of a hydraulic clutch operation system.

* * * * *